United States Patent [19]

Lehmann

[11] Patent Number: 4,941,778

[45] Date of Patent: Jul. 17, 1990

[54] METHOD AND APPARATUS FOR MEASURING AND REGULATING THE FLOW RATE OF POWDER IN A POWDER SPRAYING DEVICE

[75] Inventor: Robert Lehmann, St. Gallen, Switzerland

[73] Assignee: Ransburg-Gema AG, Switzerland

[21] Appl. No.: 214,206

[22] Filed: Jul. 1, 1988

[30] Foreign Application Priority Data

Jul. 2, 1987 [DE] Fed. Rep. of Germany ....... 3721875

[51] Int. Cl.$^5$ ............................................ B65G 51/02

[52] U.S. Cl. .................................. 406/28; 73/861.04; 250/356.1

[58] Field of Search ....................... 406/14, 19, 28, 31, 406/33, 34, 36, 153, 144, 127; 73/861.04, 861.07; 250/223 R, 564, 565, 573, 356.1, 356.2; 356/436, 442

[56] References Cited

U.S. PATENT DOCUMENTS

| | | | |
|---|---|---|---|
| 2,953,681 | 9/1960 | Frazier | 250/43.5 |
| 2,987,221 | 6/1961 | Milton | 406/144 |
| 3,498,719 | 3/1970 | Wing et al. | 356/442 |
| 3,665,201 | 5/1972 | Shea et al. | 356/342 |
| 3,997,433 | 12/1976 | Liu et al. | 209/5 |
| 4,228,353 | 10/1980 | Johnson | 250/356 |
| 4,284,032 | 8/1981 | Moos et al. | 406/14 |
| 4,381,894 | 5/1983 | Gogol, Jr. et al. | 356/72 |
| 4,519,257 | 5/1985 | Simpkins et al. | 73/861.04 |
| 4,521,139 | 6/1985 | Kretschemer et al. | 406/19 |
| 4,547,075 | 10/1985 | Fei | 356/442 |

FOREIGN PATENT DOCUMENTS

| | | |
|---|---|---|
| 0166092A1 | 1/1986 | European Pat. Off. . |
| 0183637A1 | 6/1986 | European Pat. Off. . |
| 2540911 | 4/1976 | Fed. Rep. of Germany . |
| 3016458 | 11/1981 | Fed. Rep. of Germany . |
| 3432494 | 3/1986 | Fed. Rep. of Germany . |
| 3610299 | 10/1986 | Fed. Rep. of Germany . |
| 2037691 | 7/1980 | United Kingdom . |

*Primary Examiner*—Sherman D. Basinger
*Assistant Examiner*—Edwin L. Swinehart
*Attorney, Agent, or Firm*—Ostrolenk, Faber, Gerb & Soffen

[57] ABSTRACT

An apparatus and method for accurately determining the quantity of powder flowing in a spraying device includes a power density measuring element for measuring the powder density of the powder/gas mixture flowing in the spraying device and a device for measuring the flow rate of the pure gas prior to its mixing with the powder. Signals representative of the powder density and gas flow rate are generated and transmitted to an electronic evaluation device which calculates from these measurements the absolute flow rate of the powder per unit time.

23 Claims, 2 Drawing Sheets

METHOD AND APPARATUS FOR MEASURING AND REGULATING THE FLOW RATE OF POWDER IN A POWDER SPRAYING DEVICE

BACKGROUND OF THE INVENTION

The present invention relates to a powder regulating method and apparatus for a spraying device for spraying a powdered coating on articles, and more particularly to a method and apparatus for measuring and regulating the flow rate of the powder in a powder spraying system.

A device of this type is known from Federal Republic of Germany Patent No. 28 49 295. In the known device, a pressure regulator is located in each of a gas feed line and a gas control line. The gas lines supply streams of gas to a venturi injector to cause the injector to draw powdered coating material from a powder container. From the injector, the powdered material, admix with gas, is fed through a powder feeding tube to a spraying head for being sprayed on an article.

A powder regulating instrument, disposed within the powder feeding tube, measures the flow rate of the powder, compares it to a set powder flow rate value, and controls the gas pressure in the gas lines to cause the measured powder flow rate to follow the set value. In this known arrangement, the powder regulating instrument measures either the velocity of the powder/gas mixture or the proportion of powder to gas.

An injector based powder feeding device in which powder is conveyed pneumatically by means of a stream of gas is described in United States Patent No. 3,504,945.

SUMMARY OF THE INVENTION

It is an object of the present invention to provide a method and apparatus for determining the flow rate of powder in a spraying device simply, rapidly and precisely.

It is a further object of the present invention to provide a powder spraying method and apparatus which delivers a relatively stable, disturbance free powder spray.

It is another object of the present invention to provide a powder spraying device with a display for displaying thereon the quantity of powder being delivered from the spraying device.

It is yet another object of the present invention to provide a powder spraying device with control/-regulating mechanisms for automatically setting either the quantity of powder delivered per unit time and/or for maintaining the quantity of powder being delivered per unit time at a set value, in a rapid and accurate manner.

The foregoing and other objects of the invention are realized in a powder spraying system having a pressurized gas source for delivering pressurized gas at a regulated rate to an injector channel where the gas is intermixed with powdered coating material for delivering the powdered coating material by means of a stream of gas. A powder measuring and regulating system for controlling the powder flow rate, that is the quantity of powder being delivered per unit time, operates, according to the present invention, automatically and implements the following steps.

(A) First, and not necessarily in this order, the density A of the powder in the powder/gas mixture defined as:

$$A = \frac{\text{amount of powder}}{\text{amount of gas}}$$

is determined by directing a beam of energy transversely to the flow direction of the powder/gas mixture and by measuring the attenuation of the beam passing through the powder/gas mixture or the magnitude of the reflected beam. This measurement yields a powder density value A which is representative of the ratio of powder to gas in the powder/gas mixture. In other words, the value A represents the instantaneous powder density at the location where the beam impinges on the powder stream.

(B) Next, the flow rate B of the pure gas supplied from the pressurized gas source is determined and a signal having a value B is generated which represents the amount of pure gas flowing per unit time, in other words, the gas flow rate. The gas flow rate B is defined by:

$$B = \frac{\text{amount of gas}}{\text{unit of time}}$$

(C) From the foregoing, the invention generates a value C defined by:

$$C = \frac{\text{amount of powder}}{\text{unit of time}}$$

C equals the actual flow rate of powder or, in other words, the quantity of powder flowing per unit time. The value C is obtained by multiplying the values A and B. It is also possible to evaluate/compare, for example, by carrying out repeated additions, the values A and B to derive from them the quantity C. An evaluation/-comparison is equivalent to multiplication.

The spraying device of the present invention includes, for obtaining the aforementioned values A, B and C, a beam-based powder-density measuring device for generating the powder density value A, a gas flow rate measuring device for obtaining B, and an electronic evaluation device coupled to the first mentioned devices for obtaining the value:

$$C = \frac{\text{amount of powder}}{\text{unit of time}}.$$

The beam-based powder-density measuring device includes a beam emitter and a beam receiver respectively for emitting and directing beams into the powder/gas mixture and receiving and measuring the magnitudes of beams which have either passed through the powder/gas mixture (in accordance with one embodiment) or which have been reflected therefrom (according to another embodiment).

The gas flow rate measuring device is disposed to measure the quantity of gas being supplied and for transmitting a signal B representative thereof. The electronic signals A and B are supplied to the electronic evaluation device which uses the values A and B to derive the value C by multiplying the values A and B or by evaluating/comparing the values A and B to one another. As was noted, the value C is representative of the actual quantity of powder flowing per unit time in the injector channel or, in other words, $$C = \frac{\text{amount of powder}}{\text{unit of time}}.$$

The gas in the powder/gas mixture may be simply air. The beams for measuring the density of the powder/gas mixture may be constituted of visible or invisible light. Infrared light, ultraviolet light or laser beams may be used. It is also possible to use alpha ($\alpha$) rays and/or radioactive rays or any other rays which are attenuated or reflected by powder. The degree to which the beams are attenuated or reflected depends, of course, on the nature of the powder being used. The powder may be, for example, enamel or plastic and may additionally contain metal particles to obtain a coating finish having a metallic effect. The powder may comprise a spice or a mixture of spices for spraying food products or be constituted of other fluidizable materials which can take on different shapes ranging from powder to granulate.

Thus according to the present invention, the instantaneous powder flow rate can be determined in an automatic, rapid and reliable manner by measuring the ratio of powder in the powder/gas stream A, determining the flow rate of the pure gas B, and deriving from the values A and B, by calculation or similar process, the absolute value of the flow rate of the powder C. Obtaining the absolute value of the powder flow rate constitutes an improvement over the prior art which had relied on comparison techniques to provide comparative powder flow rate indications, based on preselected reference values. It also possible, through practice of the present invention, to independently measure and control the quantity of powder flowing in each of several powder feeding lines associated with a large spraying system having several powder feeding lines, all of which are supplied with powder from a common powder container.

Another advantage of the present invention arises from the greater immunity of the measuring scheme of the invention to external effects, for example, interference from local light, which adversely impact prior art devices of the type referred to herein.

The degree of beam attenuation or reflection and, therefore, the magnitude and relation of signal levels obtained from the powder density measuring device to absolute powder density values depends on the quantity and character of powder being used. Beam signal level is therefore only indirectly related to powder density. Nonetheless, consistent density measurements are obtained for each type of powder and powder channel cross-section. Consequently, to handle a wide variety of powdered materials and device sizes, the present invention stores, in the electronic evaluation device, calibration/interpolation data, in table, equation or other form, to allow the powder density signals to be converted to absolute powder density values, based on an input specifying the powder, powder stream cross-section and/or other parameters. If desired, the above data may be stored in a memory in the powder density measuring device.

The value $$B = \frac{\text{amount of gas}}{\text{unit of time}},$$

representing the gas flow rate, can be determined in several ways. In accordance with a first method, the gas flow rate value B is obtained from gas flow measuring instruments which are deployed in one or more of several gas lines in the spraying device, upstream of the powder injector channel where the gas is still pure. The gas flow measuring instruments produce a signal whose magnitude is proportioned to the bulk flow rate of the gas.

A second method is based on deploying pressure measuring instruments in the gas lines, upstream of the powder/gas mixing chamber, for measuring the gas pressure. In this case, it is, however, necessary to provide, preferably in the memory of the electronic evaluation device, gas pressure to bulk flow rate conversion tables or curves to permit converting of the gas pressure values to bulk flow rate values.

In a third method, the gas flow rate is controlled by means of pressure regulators disposed in the flow path of the gas. The pressure regulators are controlled, in turn, by gas flow control signals issued by the electronic evaluation device. In this method, the gas flow control signals are also used in the electronic evaluation device for generating the gas flow values B. The method avoids the need to carry out actual gas flow measurements and produces simpler hardware. However, because the gas flow control signals are pressure based signals, the information obtained from them must be converted to actual gas flow rate values by reference to conversion tables or curves as in the second method above. Gas flow rate may be related in the conversion tables to pressure P and to the length and cross-sectional sizes of the gas feeding lines. Overall, the process of obtaining the values B is facilitated through simple tapping of the signals which are, in any case, generated in order to carry out the gas pressure regulating function in the spraying device.

In an alternate embodiment, the powder density measuring device comprises a plurality of beam transmitters and beam receivers which are disposed about the powder/gas channel to scan the powder/gas stream from different directions along a given cross section to obtain an averaged density measurement. Although, the density measurements are generally reliable because the powder is homogeneously distributed in the channel as a result of the circulation and eddying of the powder by the gas, local or temporary disturbances are nevertheless possible. But, the possibility of generating erroneous readings due to temporary or local disturbances in the powder/gas stream is avoided in this embodiment.

In accordance with a further refinement, the path of the beams from the transmitter to the receiver extends transversely to the flow channel and, therefore, to the powder/gas stream.

It is also an aspect of the present invention that the beam transmitter and the beam receiver are protected from being contaminated by the powder by sensing that the gas flows at very high velocity and generally nearer the inner wall surface in the channel Consequently, the powder cannot pass through the gas and settle on either the beam transmitter or beam receiver, even in embodiments in which the ends of the transmitter and receiver terminate within the channel or alongside the stream of gas.

The transmitter and receiver may, however, terminate in the wall of the channel and the portion of the wall separating the transmitter and receiver from the interior of the channel is constituted therefore of material which is transparent to the beam. It is impossible for powder to settle on the transmitter or on the receiver in this embodiment.

In a specialized form of the invention, the cross section of the powder injector channel is wider at its upstream end, narrows toward the middle of the channel, and widens again toward the downstream end thereof. The powder feeding line enters the injector channel upstream of the narrowest cross section while at least one of the several gas feeding lines emerges in the inner surface of the wall of the channel at the narrowest section thereof. Superior powder density measurements are obtained with this embodiment because the powder is more effectively and homogeneously distributed in the injector channel. Another advantage of the present embodiment lies in a simpler mounting of the beam transmitter and beam receiver, in a manner that prevents the contamination thereof by powder or their exposure to externally originating disturbing factors.

Preferably, the evaluation device of the present invention is constituted of a microcomputer and a related program which interact with the various system components to receive the values A and B and to derive from them the absolute flow rate value C of the powder.

Other features and advantages of the present invention will become apparent from the following description of the invention which refers to the accompanying drawings.

DETAILED DESCRIPTION OF THE DRAWINGS

Figure 1:
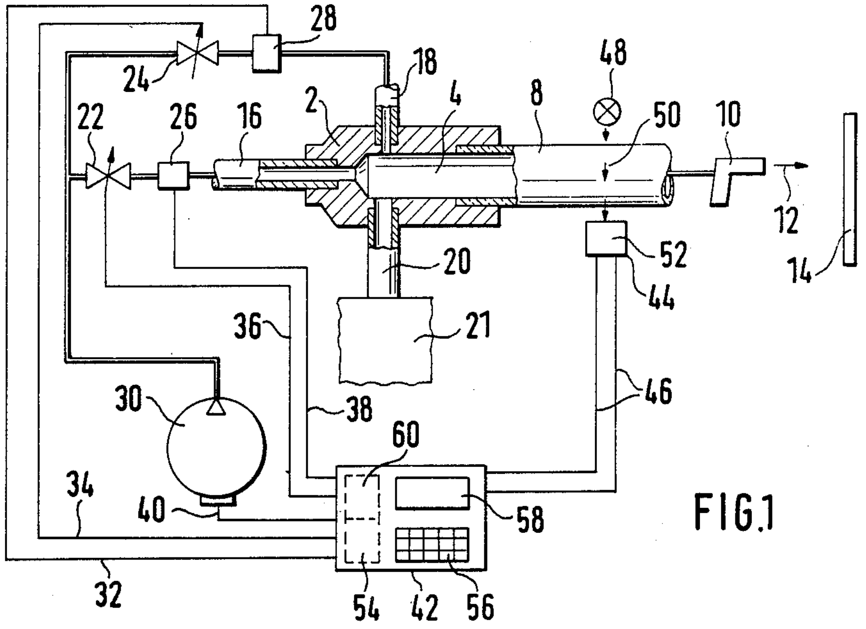
FIG. 1 is a block diagram of a spraying device in accordance with the present invention.

Referring to FIG. 1, a spraying device according to the present invention includes an injector member 2, defining an injector channel 4, and several lines leading into the channel 4 including a main gas line 16, a control gas line 18, and a powder feeding line 20. The injector channel 4 forms a venturi chamber which draws powdered coating material from a powder container 21. A powder/gas conveying tube 8 is connected to the downstream end of injector channel 4 and through the tube 8 the powdered coating material is supplied to a spraying head 10. A stream 12 of the powdered coating material 12 is sprayed from the spraying head 10 onto an article 14 to be coated.

The main gas line 16 is axially connected to the, upstream end of the injector channel 4 while the second control gas line 18 and the powder feeding line 20 enter the injector channel 4 radially and at the upstream end thereof. The gas lines 16 and 18 are supplied with pressurized gas from a gas tank 30 and each line 16/18 is interrupted by a respective pressure regulator 22 and 24 and/or by a respective pressure measuring instrument 26 and 28.

Overall control of the spraying device of the present invention is provided by means of an electronic evaluation device 42 which is connected to the pressure regulators 22 and 24, the pressure measuring instruments 26 and 28, and the gas tank 30, through respective electrical wires 32, 34, 36, 38 and 40.

A powder density measuring device 44 flanks the powder/gas conveying tube 8 and is connected to the electronic evaluation device 42 through electrical wires 46. The device 44 includes a transmitter 48 for transmitting beams 50 through the tube 8 and a beam receiver 52, disposed oppositely to the transmitter 48, for receiving beams 50 passing through the tube 8. The beams 50 are attenuated both by the wall of the tube 8 and by the powder/gas stream flowing through the tube 8. But the magnitude of the beams received in the receiver 52 varies only as a function of the powder density because the wall thickness and, therefore, its effect on the beams 50 does not vary. Consequently, it is possible to measure and calculate the magnitude differences of the transmitted and received beams and to obtain the density values A because the differences are solely proportional to powder density.

Figure 2:
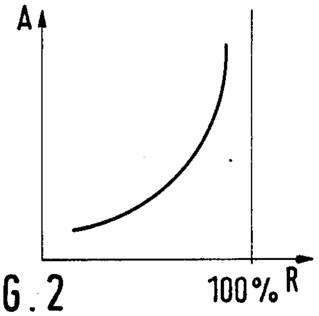
FIG. 2 is a graph (not drawn to scale) of the relationship of the powder density A of the powder/ gas mixture to a quantity R representing the attenuation or reflection rate of the transmitted beams.

The degree to which the beams are attenuated or reflected by the powder varies as a function of powder density $$A = \frac{\text{amount of powder}}{\text{amount of gas}},$$

generally in accordance with relationship depicted by the density curve of FiG. 2. Different types of powdered coating materials have somewhat differently shaped density curves. It is therefore possible and desired to store, in a memory 54 of evaluation device 42, various density curves for different types of powders and powder stream sizes. A given curve is then selected for each particular application through the keyboard 56 to permit density values $$A = \frac{\text{amount of powder}}{\text{amount of gas}}$$

to be calculated from the beam measurements based on the selected contents of memory 54. The density values A may be displayed on the display device 58 of evaluation device 42.

Figure 3:
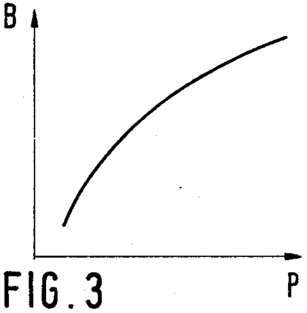
FIG. 3 is a non-scaled graph of the relationship of the gas flow rate B of the pure gas to the gas pressure P thereof.

Evaluation device 42 includes a second memory 60 for storing a second table or set of curves corresponding to the gas pressure versus gas flow rate relationship of FIG. 3. The information in memory 60 defines the relationship of the gas flow rate $$B = \frac{\text{amount of gas}}{\text{unit of time}}$$

versus gas pressure P (or the size of the cross-section or length of the gas feeding lines) for the gas flowing from the gas tank 30 through the main gas line 16 and the control gas line 18, into the upstream end of the injector channel 4. In the context of the present invention, the memory 60 forms a gas flow rate measuring device which provides the evaluation device 42 with the values $$B = \frac{\text{amount of gas}}{\text{unit of time}}$$

which represent the gas flow rate as a function of various parameters, for example, gas pressure P. The input to the memory 60 is the instantaneous gas pressure P which is set by and therefore known to the electronic evaluation device 42 and which it transmits over lines 34 and 36 to the pressure controllers 22 and 24. Another pressure setting signal is provided by the evaluation device 42 to gas tank 30 over line 40.

Because the various pressure setting signals are generated in the evaluation device 42, conversion of the pressure setting signals to a gas flow rate signal/value B, by reference to the memory 60, proceeds in a simple and straightforward manner. Standard conversion data may be retrieved from memory 60 to obtain the values B or the conversion data may be selected through the keyboard 56 on the basis of the parameters and conditions of the given application.

It is possible, in case of failure or nonavailability of the memory 60, to obtain the gas flow rate values $$B = \frac{\text{amount of gas}}{\text{unit of time}}$$

through evaluation of the pressure measurement signals prevailing at the lines 32 and 38 which are connected to the pressure measuring instruments 28 and 26. The magnitudes of the signals on lines 32 and 38 are directly related to the pressure at the instruments 28 and 26 and, therefore, to gas flow rate.

As described above, the invention is based on obtaining signals A which are representative of the density of powder in the gas and signals B which represent the quantity of pure gas flowing per unit time. The signals A and B are then electronically multiplied, or combined in a different manner to produce an effect similar to multiplication, within the evaluation device 42. The multiplication yields signal values $$C = \frac{\text{amount of powder}}{\text{unit of time}}$$

indicative of the rate at which the powder is being delivered in the spraying device. The values C may be selectively displayed on display 58.

Figure 4:
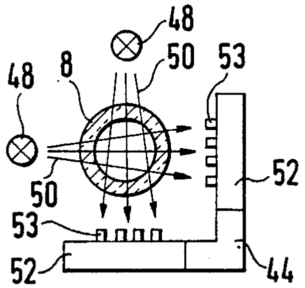
FIG. 4 depicts a preferred transmitter/ receiver arrangement.

Instead of the single transmitter/receiver embodiment of FIG. 1, a modified density measuring device 44 shown in FIG. 4 comprises a plurality of beam transmitters 48 and beam receivers 52 so arranged that each transmitter 48 is juxtaposed to a respective one of the receivers 52. The transmitters 48 preferably include first and second transmitters which are spaced about 90° apart relative to the axis of the tube 8 with each beam 50 of the transmitters 48 scanning, raster like, along the cross-section of the tube 8. The scanning beams 50 transmitted by the transmitters 48 cross one another in the interior of the tube 8 and each scanning beam 50 emerges to be received by a respective set of the plurality of beam sensors 53 incorporated in each of the receivers 52. Averaging or weighing of the outputs of the receivers 52 yields an average density value $$A = \frac{\text{amount of powder}}{\text{amount of gas}}$$

which is relatively immune to local disturbances in the powder profile.

Figure 5:
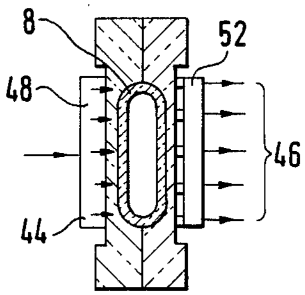
FIG. 5 shows, in cross-section, another embodiment of a transmitter/receiver arrangement.

In another configuration of the density measuring system 44, depicted in FIG. 5, the tube 8 is somewhat flattened and the beam transmitter 48 and beam receiver 52 are respectively disposed on opposite sides of the tube 8 along the flattened portions thereof.

Figure 6:
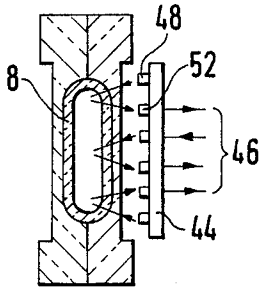
FIG. 6 shows a further transmitter/receiver arrangement for detecting reflected beams.

In FIG. 6, the beam transmitter 48 and beam receiver 52 of the powder density measuring system 44, are disposed on the same side of the tube 8 to allow the receivers 52 to measure the degree reflection of the beams 50 by the powder within tube 8 for calculating powder density values.

The material of tube 8 and of other elements, if any, in the path between the transmitter 48 and receiver 52 and the powder/gas mixture itself must be transmissive to the beams 50. In fact, the material of the tube 8 and of the other elements should be substantially more transmissive to the beams 50 than the powder. Therefore, where light beams are used, the material of tube 8 should be constituted of transparent glass or plastic.

Figure 7:
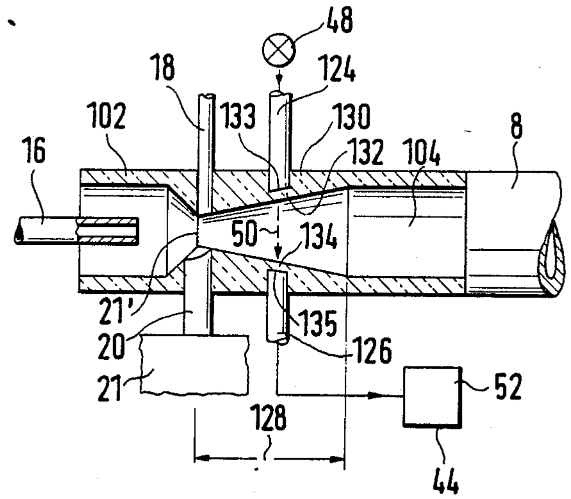
FIG. 7 is a cross-section through a modified powder/gas injector/conveyor of the spraying device of FIG. 1.

A further embodiment of the present invention comprises, as shown in FIG. 7, a modified injector type powder feeding device 102 having two gas lines 16 and 18 for supplying gas and a powder line 20 for delivering powder from a powder container 21. The key difference of the present embodiment lies in that the powder density measuring device 44 is spaced away from the tube 8 and is connected thereto by several light guides 124 and 126. The light guides 124 and 126 are disposed within a constricted channel section 128 of an injector channel 104 and simplify the structure of the spraying device by guiding the beams 50 to desired locations on the channel 104.

Note that the light guides 124 and 126 do not penetrate the wall 130 of the injector channel 104. Rather, the ends 133 and 135 of the light guides are separated from the injector channel 104 by thin wall sections 132 and 134 which are of light transmissive material to enable the beams 50 to pass through while protecting the light guides 124 and 126 from being contaminated by powder. The ends 133 and 135 of the light guides 124 and 126 should preferably be disposed very near to, or directly at, the narrowest point 21' of the injector channel 104, downstream of the powder line 20.

Figure 8:
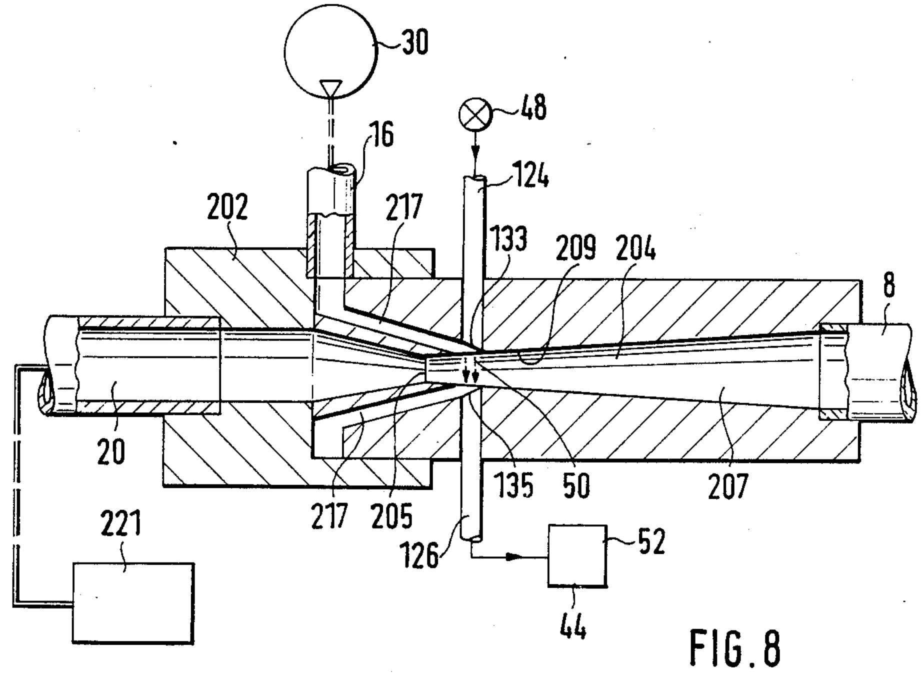
FIG. 8 depicts another variant of the spraying device of FIG. 7.

FIG. 8 depicts another embodiment of the present invention having an injector type powder conveyor 202 which includes an injector channel 204 which widens continuously in the downstream direction, starting from a narrow portion 205 thereof. A plurality of gas channels 217 are circumferentially spaced from one another and connected at one of their ends to the gas line 16 for receiving gas from gas tank 30. The other ends of the channels 217 are inclined at a small acute angle relative to the axis of the channel 204 and lead into the channel 204 through the surface 209 of the channel.

A powder line 20 leads from a powder container 221 and enters the upstream end of injector channel 204 axially, upstream of the gas channels 217. The gas flowing in the gas channels 217 produces a venturi effect which draws the powder through the powder line 20 and impels it as a powder/gas mixture through the conveyor tube 8.

In this embodiment, the ends 133 and 134 of the light guides 124 and 126 are set radially further out relative to the injector channel 204. As a result, the high velocity gas flowing in from the gas channels 217 forms a barrier between the light guides and the powder particles in the injector channel 204, ensuring that no particles of powder are able to contact the ends 133 and 135 of the light guides 124 and 126. Another advantage of the embodiment of FIG. 8 results from the clear and direct path formed between the ends 133 and 135 of the light guides 124 and 126. Consequently, only the powder/gas is present to attenuate/ reflect the beams 50. The signals detected in the receivers 52 are therefore larger and easier to detect and the density measurements are more reliable and the conversion of the detected signals to density values A is facilitated. Also, because the ends 133 and 135 of the light guides 124 and 126 are disposed oppositely to one another, in the mouth openings of the gas channels 217 on the radially outer channel edges, no obstructions to gas flow are present in the gas channels 217.

The embodiment of FIG. 8 is particularly effective for conveying powder at a greater rate and for permitting even very small changes in powder density to be measured. In part, this results from the stronger and more turbulent flow of the gas in the injector channel 204 which causes the powder to be better mixed and more uniformly distributed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for determining the flow rate of powder in a spraying device having a gas inlet, a powder inlet, and a channel through which the powder and gas admixed with one another are conveyed, the method comprising the steps of:

directing a beam transversely to a powder/gas flow direction in the channel, receiving a beam that had been subjected to the influence of the powder in the channel, and deriving from the received beam a powder density value indicative of the powder density of the powder in the channel;

generating a first signal representative of the power density value, in which the power density value is equal to A wherein:

$$A = \frac{\text{amount of powder}}{\text{amount of gas}};$$

determining the flow rate of a gas entering through the gas inlet and generating a gas flow rate value indicative of the flow rate of the gas;

generating a second signal representative of the gas flow rate value, wherein the gas flow rate value is represented by B wherein:

$$B = \frac{\text{amount of gas}}{\text{unit of time}};$$

calculating, from the powder density value A and from the gas flow rate value B, a powder flow rate value C indicative of the flow rate of the powder in the channel, by multiplying the power density value A by the gas flow rate value B; and generating a third signal indicative of the power flow rate value C defined as:

$$C = \frac{\text{amount of powder}}{\text{unit of time}}.$$

2. A spraying device, comprising:

an injector channel for conveying a mixture of gas and powder;

at least one gas line communicating into the injector channel for introducing gas into the injector channel;

a powder feeding line for feeding powder into the injector channel;

first means for producing a powder density signal representative of the powder density of the powder in the channel by directing a beam transversely to the flow direction of the mixture of gas and powder in the injector channel, the power density signal being defined by A where:

$$A = \frac{\text{amount of powder}}{\text{amount of gas}};$$

second means for producing a gas bulk flow rate signal indicative of the gas flow rate of the gas entering the injector channel, the gas bulk flow rate signal being defined by B where:

$$B = \frac{\text{amount of gas}}{\text{unit of time}}; \text{ and}$$

evaluating means for deriving from the powder density signal and from the gas flow rate signal a powder flow rate signal indicative of the flow rate of the powder in the injector channel, by multiplying the power density signal and the gas bulk flow rate signal.

3. The spraying device for claim 2, in which the first, powder density measuring, means comprises a beam-based density measuring device including at least one beam transmitter for transmitting the beam to the powder in the injector channel, at least one beam receiver for receiving a beam that had been subjected to the powder in the channel, the evaluating means being coupled to the at least one beam receiver and effective to convert a signal received from the beam receiver to the powder density signal.

4. The spraying device of claim 3, in which the beam receiver is juxtaposed to the beam transmitter across the injector channel to receive a beam that had passed through and had been attenuated by the powder in the channel.

5. The spraying device of claim 4, wherein the injector channel contains flattened sides and the beam transmitter and receiver are disposed against a respective one of the flattened sides.

6. The spraying device of claim 3, in which the beam receiver is disposed to receive a beam reflected from the powder in the channel.

7. The spraying device of claim 3, further comprising a memory in the evaluating device and a conversion table in the memory for converting signals received from the beam receiver to yield the powder density signal.

8. The spraying device of claim 7, wherein the conversion table includes a plurality of conversion curves for different powders and different parameters associated with powder spraying devices and including means for selecting a desired one of the conversion curves.

9. The spraying device of claim 8, wherein the selecting means comprises a keyboard disposed in the evaluating device.

10. The spraying device of claim 3, wherein the beam transmitter and receiver are so disposed to one another that the beam transmitted by the beam transmitter and received at the beam receiver extends transversely to the injector channel.

11. The spraying device of claim 3, wherein the density measuring device comprises a plurality of beam receivers disposed spacedly from one another to receive different beams passing in different directions through a cross section of the injector channel for producing an averaged powder density value.

12. The spraying device of claim 11, wherein the plurality of beam receivers includes a first beam receiver and a second beam receiver and the first and second beam receivers are spaced to receive beams passing substantially orthogonally relative to one another.

13. The spraying device of claim 3, wherein the beam transmitter and the beam receiver are in communication with the interior of the injector channel in a manner which allows a beam transmitted from the beam transmitter and received by the beam receiver to pass solely through the powder/gas stream in the injector channel.

14. The spraying device of claim 3, wherein the injector channel is defined by a surrounding wall and the beam transmitter and beam receiver terminate in the surrounding wall and wherein at least that portion of the wall which is disposed between the beam transmitter and beam receiver, on one hand, and the interior of the injector channel, on the other hand, is comprised of material which is transparent to the beam.

15. The spraying device of claim 3, wherein the injector channel is wider at an upstream end thereof, narrows in the downstream direction thereof and widens again before it reaches its downstream end.

16. The spraying device of claim 15, in which the powder feeding line enters the injector channel axially, upstream of the narrowest cross section of the injector channel, and wherein the gas line enters the injector channel downstream of the entry point of the powder feeding line.

17. The spraying device of claim 3, further including light guide means coupled to the density measuring device for guiding the beam therethrough.

18. The spraying device of claim 3, wherein the second means comprises means for regulating the quantity of gas flowing in the gas feeding line and a signal for controlling the regulating means, which signal is proportional to the bulk flow rate of the gas.

19. The spraying device of claim 18, wherein the gas flow rate of the gas is measured at a point before the gas is admixed with powder.

20. The spraying device of claim 19, further comprising a second memory in the evaluating device and a conversion table in the second memory for allowing a gas pressure signal to be converted to a gas flow rate based on predetermined parameters.

21. The spraying device of claim 3, wherein the second means comprises a pressure regulator in the gas line and a signal outputted by the evaluating means for controlling the pressure regulator and wherein the signal controlling the regulator is effective for being used in the evaluation device to indicate the gas flow rate.

22. The spraying device of claim 21, wherein the predetermined parameters include gas pressure, cross-section of a gas conduit and/or the length of a gas conduit.

23. The spraying device of claim 3, wherein the evaluating means comprises a microcomputer and a related program for controlling the spraying device.

* * * * *